O. EBERHARD.
PROCESS FOR THE CONTINUOUS MECHANICAL MANUFACTURE OF OBJECTS FROM PLASTIC SUBSTANCES.
APPLICATION FILED JAN. 30, 1913.
1,083,275.  Patented Jan. 6, 1914.
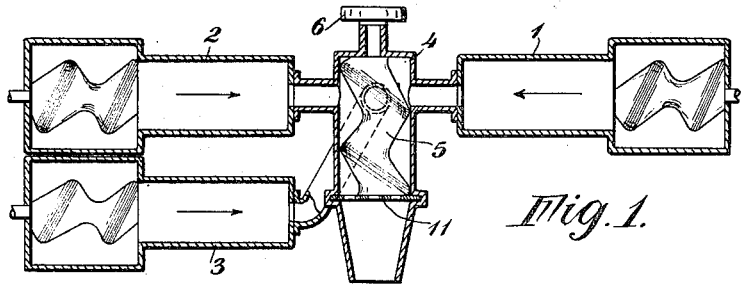
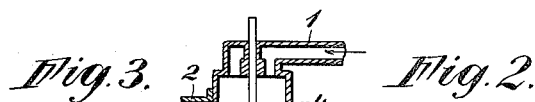
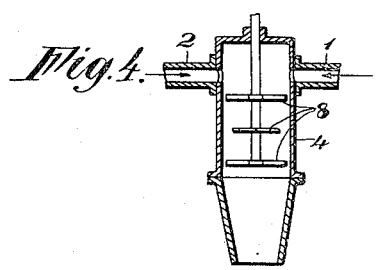
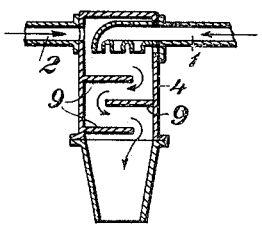
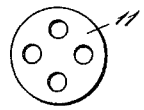
WITNESSES:
John C. Sande
H. B. Cottrell
INVENTOR:
Otto Eberhard
BY Wm Wallace White
ATTY

UNITED STATES PATENT OFFICE.

OTTO EBERHARD, OF HEIDENAU, NEAR DRESDEN, GERMANY.

PROCESS FOR THE CONTINUOUS MECHANICAL MANUFACTURE OF OBJECTS FROM PLASTIC SUBSTANCES.

1,083,275. Specification of Letters Patent. Patented Jan. 6, 1914.

Application filed January 30, 1913. Serial No. 745,177.

*To all whom it may concern:*

Be it known that I, Dr. OTTO EBERHARD, a subject of the German Emperor, residing at 7 Bergstrasse, Heidenau, near Dresden, in the German Empire, have invented certain new and useful Improvements in Processes for the Continuous Mechanical Manufacture of Objects from Plastic Substances, of which the following is a specification.

The present invention has for its object a process for the continuous mechanical manufacture of objects from plastic substances with a uniform or permanent pattern, changeable as desired, such substances being advantageously of an organic nature such as artificial horn and the like, the manufacture being effected by pressure devices. It is already known in the manufacture of patterned objects such as soaps, sweets, to cause diversely colored streams manufactured by separate presses to pass through a mandrel or die and to unite them to a single cord under constant pressure. The present invention differs therefrom essentially in the fact that the diversely colored separate streams coming from the separate presses, are led together to a chamber provided with mixing or deviating devices and leave the latter as a patterned combined stream. These inserted elements obstruct the smooth passage of the streams so that corresponding changes in position and consequently modification of the pattern are effected. The same arrangement of the elements will naturally always give the same pattern. In order to attain a greater variety the inserted elements can be constantly actuated by a device. This again enables the same pattern always to be obtained or to be repeated by causing a certain inserted element to rotate at a certain number of revolutions.

The apparatus serving for carrying out the novel method into practice consists of a suitable number of stream presses opening into a chamber provided with stationary or movable mixing or deviating devices and comprising outlets for the patterned combined stream.

In the accompanying drawing several embodiments of the apparatus are illustrated.

Figure 1 shows a triple press in horizontal section. Figs. 2, 4 and 5 show three different constructions of a mixing chamber of a double press, in horizontal section. Fig. 3 in an end view of the inserted element of Fig. 2. Figs. 6 and 7 show two different constructionals of a perforated disk located at the outlet end of the mixing chamber.

In the construction of Fig. 1, there are three separate presses which are provided in the usual manner with conveying worms and open into the common mixing chamber 4. The latter is provided with a mixing element such as a slowly rotating worm 5 driven by the pulley 6. The worm 5 does not serve to convey the substances like the worms in the presses 1 to 3 because this is already effected by the pressure exerted on the separate streams of the presses 1, 2 and 3 which unite in the mixing chamber 4. The worm 5 of the latter chamber rather serves to produce a certain kind of spiral pattern as each rib of the worm effects on passing before the inlets a certain division. Thus the various streams are continuously divided by the worm 5 in different ways. The slowly rotating worm 5 can therefore be replaced by other mixing elements. In Fig. 2, a cross 7 instead of the mixing worm, is inserted in the mixing chamber 4 and in this case, streams only from two separate presses 1, 2 unite. The cross 7 can also be slowly rotated and acts in a manner different to that of the worm 5 of Fig. 1, on the combined stream leaving the mixing chamber. A row of such crosses or star-like structures can be arranged in series in the mixing chamber as shown in Fig. 4. In the latter case there are three crosses 8, relatively staggered and mounted in series on the same shaft in the mixing chamber 4.

As said before, the inserted elements may instead of being rotatable, be stationary or movable in a different manner. In Fig. 5 there are stationary inserted elements 9 arranged within the mixing chamber 4 and consisting of rods or other projections. The outlets of two presses 1, 2 open into the mixing chamber, one of them being provided with three spouts 10.

It is evident that the mixing elements can be of any shape provided that they produce a deviation of the separate colored substances lying beside one another, whereby a certain pattern is obtained. The pattern of the combined stream leaving the mixing chamber 4 can be still further influenced by providing perforated disks 11 at the outlet end of the chamber, two constructions thereof being shown in Figs. 6 and 7. The perforations of these disks 11 may also be different.

I claim:

1. A process of manufacturing articles from plastic substances consisting in supplying separate plastic cords of different color from a plurality of press devices to a mixing chamber, combining said cords under constant pressure and diverting them in their direction one to each other within the mixing chamber from which they issue as a patterned combined cord.

2. A process of manufacturing articles from plastic substances consisting in supplying separate plastic cords of different color from a plurality of press devices to a mixing chamber containing inserted elements combining said cords under constant pressure and diverting them in a regular manner within the mixing chamber from which they issue as a patterned combined cord.

3. A process of manufacturing articles from plastic substances consisting in leading separate plastic cords of different color manufactured by separate presses into a mixing chamber, uniting the cords therein under constant pressure and mixing said cords by movable elements inserted in said mixing chamber from which they issue as a patterned combined cord.

In testimony whereof I affix my signature in presence of two witnesses.

Dr. OTTO EBERHARD.

Witnesses:
 EMIL PIERRETTE,
 PAUL GREINER.